United States Patent [19]

Ikeda et al.

[11] 4,322,319

[45] Mar. 30, 1982

[54] RUBBER COMPOSITION CONTAINING CROSSLINKABLE PROCESSING AID

[75] Inventors: Hiroharu Ikeda, Machida; Yasuyuki Shimozato, Yokohama; Kazuo Sekine, Tokyo, all of Japan

[73] Assignee: Japan Synthetic Rubber Co., Ltd., Tokyo, Japan

[21] Appl. No.: 182,584

[22] Filed: Aug. 29, 1980

[30] Foreign Application Priority Data

Aug. 29, 1979 [JP] Japan ................................ 54-109223
Sep. 5, 1979 [JP] Japan ................................ 54-112858

[51] Int. Cl.³ .......................... C08L 7/00; C08L 9/00; C08L 9/06
[52] U.S. Cl. .................................. 525/194; 525/196; 525/208; 525/214
[58] Field of Search ...................... 525/214, 208, 196; 260/5

[56] References Cited

U.S. PATENT DOCUMENTS 3,025,261  3/1962  Sterling ............................... 525/214
3,335,202  8/1967  Giulio et al. ........................ 525/232
4,094,831  6/1978  Sandstrom ............................ 260/5

FOREIGN PATENT DOCUMENTS 52-72742  6/1977  Japan .

*Primary Examiner*—Wilbert J. Briggs, Sr.
*Attorney, Agent, or Firm*—Oblon, Fisher, Spivak, McClelland & Maier

[57] ABSTRACT

A rubber composition comprising (A) 100 parts by weight of a rubber; (B) 5 to 50 parts by weight of a low molecular weight diene copolymer containing a glycidyl group-containing monomer or chloromethylstyrene, said copolymer (B) comprising 30% by weight or less of copolymerized styrene, and having an intrinsic viscosity of 0.2 to 1.3 dl/g as measured in toluene at 30° C.; (C) a crosslinking agent reactive with the glycidyl group or the chloromethyl group in the copolymer (B) selected from ($C_I$) a metallic oxide and ($C_{II}$) an amine compound; and (D) 0.2 to 7 parts by weight, per 100 parts by weight of the rubber (A), of sulfur. This rubber composition has a good processability and can give a vulcanizate having excellent physical properties.

11 Claims, No Drawings

RUBBER COMPOSITION CONTAINING CROSSLINKABLE PROCESSING AID

BACKGROUND OF THE INVENTION

1. Field of the Invention

This invention relates to a rubber composition having a good processability and capable of giving a vulcanizate having excellent properties. More particularly, it relates to a rubber composition comprising a diene copolymer, having a relatively low molecular weight, produced by copolymerizing chloromethylstyrene or a glycidyl group-containing monomer, and a cross-linking agent reactive with the glycidyl group or chloromethyl group in which the diene copolymer is difficult to migrate and accordingly the properties of its vulcanizate are not deteriorated.

2. Description of Prior Art

As a method for improving the processability of rubber, a softening agent such as an extender oil, a petroleum resin or the like has hitherto been blended therewith. However, in such a method for improving the processability of rubber by the use of such softening agents, there are problems that the properties of its vulcanizate are deteriorated, and the softening agent in the vulcanizate bleeds out to cause an insufficient adhesion to other vulcanized rubber compositions contacted with the vulcanizate, or the softening agent migrates into said other vulcanized rubber compositions contacted with the vulcanizate to adversely affect the properties of vulcanized rubber composition, even though the processability of rubber can be improved. Accordingly, it has recently been desired in many fields of rubber industry to develop softening agents which hardly migrate, namely, so-called reactive softening agents.

In order to suppress the deterioration of the vulcanizate properties due to softening agents, it is known to use a low molecular weight rubber as a softening agent for the sake of improving the processability and, at the same time, to co-vulcanize the low molecular weight polymer and the rubber. However, this co-vulcanization does not always progress sufficiently, so that the migration of the softening agent is not sufficiently inhibited, and the properties of vulcanizate are not sufficiently stable for a long period of time.

The present inventors have conducted extensive studies for obtaining a rubber composition having an improved processability, in which the low molecular weight polymer contained therein as a softening agent does not migrate even in its vulcanizate and hence, the properties of the vulcanizate do not deteriorate. As a result, it has been found that a low molecular weight copolymer containing glycidyl groups or chloromethyl groups acts as a softening agent for the rubber composition at the time of processing and said low molecular weight copolymer is converted into a product having a high molecular weight and a crosslinking structure by the reaction of the glycidyl groups or chloromethyl groups with the crosslinking agent upon vulcanization, so that the rubber composition containing said low molecular weight copolymer exhibits a good processability in the unvulcanized state and the properties of its vulcanizate are excellent.

SUMMARY OF THE INVENTION

It is an object of this invention to provide a rubber composition having an improved processability.

It is another object of this invention to provide a rubber composition having an improved processability, the vulcanizate of which has excellent physical properties and is difficult to migrate.

Other objects and advantages of this invention will become apparent from the following description.

According to this invention, there is provided a rubber composition comprising (A) 100 parts by weight of a rubber, (B) 5–50 parts by weight of a low molecular weight diene copolymer containing a glycidyl group-containing monomer or chloromethylstyrene, said copolymer comprising 30% by weight or less of copolymerized styrene, and having an intrinsic viscosity of 0.2–1.3 dl/g as measured in toluene at 30° C., (C) a specified crosslinking agent reactive with the glycidyl group or the chloromethyl group in the copolymer (B), and (D) 0.2–7 parts by weight or less, per 100 parts by weight of the rubber (A), of sulfur.

DETAILED DESCRIPTION OF THE INVENTION

The components constituting the copolymer (B) used in this invention are a glycidyl group-containing monomer or chloromethylstyrene, and a conjugated diene having 4 or 5 carbon atoms, and optionally styrene. The glycidyl group-containing monomer referred to herein includes glycidyl methacrylate, glycidyl acrylate, allyl glycidyl ether and the like, among which glycidyl methacrylate is preferable. The chloromethylstyrene referred to herein includes styrenes having a chloromethyl group at the ortho-, meta- or para-position and their mixtures. The content of the glycidyl group-containing monomer in the copolymer (B) is 5–30% by weight. If it is less than 5% by weight the reactivity of the copolymer (B) is low, and hence, said proportion is undesirable. If it exceeds 30% by weight the softening effect decreases, and hence, said proportion is undesirable.

The conjugated diene having 4 or 5 carbon atoms which is a constituent of the copolymer (B) includes butadiene, isoprene, piperylene and the like, among which butadiene is preferable. The content of the conjugated diene in the copolymer (B) is preferably 50% by weight or more. It it is less than 50% by weight the softening effect of the copolymer decreases, and hence, said proportion is undesirable. The content of styrene constituting the copolymer (B) is 0–30% by weight. If it exceeds 30% by weight the softening effect of the copolymer (B) decreases, and hence, said proportion is undesirable.

The intrinsic viscosity $[\eta]$ of the copolymer (B) used in this invention must be 0.2 to 1.3 dl/g as measured in toluene at 30° C., preferably 0.3–1.0 dl/g. If $[\eta]$ is less than 0.2 dl/g, the crosslinkage of the copolymer (B) is insufficient and the migration of the copolymer (B) is not suppressed so that the physical properties of the vulcanizate are deteriorated. On the other hand, if $[\eta]$ exceeds 1.3 dl/g, the effect of the copolymer (B) as a softening agent for improving the processability decreases, and hence, said intrinsic viscosity is undesirable. Though the copolymer (B) is a viscous liquid or a semi-solid at room temperature, it is liquid at the temperature at which it is blended with the rubber (A) and the blend is processed.

The rubber (A) which is a constituent of the rubber composition of this invention includes natural rubber, polyisoprene rubber, polybutadiene rubber, styrene-butadiene rubber, ethylene-propylene rubber, nitrile rubber, isobutylene rubber, a rubber having the same constituents as the above-mentioned copolymer (B) containing a glycidyl group-containing monomer or chloromethylstyrene, and the like, among which natural rubber, polyisoprene rubber, polybutadiene rubber and styrene-butadiene rubber are particularly preferable. When the copolymer (B) is incorporated with the rubber (A), 5–50 parts by weight of the copolymer (B) is added to 100 parts by weight of the rubber (A). If the amount of the copolymer (B) is less than 5 parts by weight, the processability of the rubber composition cannot be improved. If it exceeds 50 parts by weight, the properties of the rubber (A) itself are impaired, and hence, said proportion is undesirable. As the process for blending the copolymer (B) with the rubber (A), a direct blending process (dry blend) by means of a Banbury mixer or a roll; a process which comprises blending a latex of the copolymer (B) with a latex of the rubber (A) and a process which comprises blending a solution of the copolymer (B) with a solution of the rubber (A) (wet blend) may be used. Though these processes do not affect the physical properties of the composition, the wet blend is more preferable in view of easy production.

The rubber composition of this invention comprising the rubber (A) and the copolymer (B) is subjected to crosslinking through a specific crosslinking agent reactive with the glycidyl group or the chloromethyl group, or subjected simultaneously to the said crosslinking and vulcanization with sulfur.

As the crosslinking agent (C) for forming crosslinkages through reaction with the chloromethyl group, there are used metallic oxides ($C_I$), which are employed as vulcanization accelerators in the sulfur vulcanization process, alone or in combination with amine compounds ($C_{II}$) such as polyamines, polyamine salts of carboxylic acids and the like.

As the crosslinking agent (C) for forming crosslinkages through reaction with the glycidyl group, there are used such amine compounds ($C_{II}$) as in the case of the chloromethyl group, alone or in combination with said metallic oxides ($C_I$).

In order to allow the crosslinking to proceed sufficiently and to inhibit the scorching, it is more preferable to use a metallic oxide and a polyamine salt of carboxylic acid in combination. In the case of the copolymer (B) containing a glycidyl group-containing monomer, however, the crosslinking is insufficient if only a metallic oxide ($C_I$) is used as a crosslinking agent. As said polyamine, there may be used hexamethylenediamine, N,N'-dimethyl-p-phenylenediamine, secondary amines such as piperazine and the like, and tertiary diamines such as triethylenediamine and the like. Diethylenetriamine, triethylenetetramine, hexamethylenetetramine, polyethyleneimine and the like may also be used. On the other hand, as the carboxylic acid for forming said salt, there may be used monocarboxylic acids such as acetic acid, propionic acid, octanoic acid, stearic acid, benzoic acid and toluic acid; dicarboxylic acids such as oxalic acid, malonic acid, succinic acid, adipic acid, sebacic acid, phthalic acid and the like; carboxylic acids having a hydroxyl group such as glycolic acid, malic acid, lactic acid, p-oxybenzoic acid and the like; and carboxylic acids having a thiol group such as thioglycolic acid and the like. Among the salts of amine compounds with carboxylic acids, preferred are piperazine oxalate, piperazine glycolate, piperazine malate, piperazine lactate, piperazine p-oxybenzoate, piperazine stearate, hexamethylenediamine succinate (6,4-Nylon salt), and hexamethylenediamine sebacate (6,10-Nylon salt).

As said metallic oxide ($C_I$), there may be used zinc oxide, lead oxide, magnesium oxide and the like, among which zinc oxide and lead oxide are preferable. Since zinc oxide is used more generaly in the case of sulfur vulcanization, it is particularly preferable when vulcanization is carried out simultaneously.

The amount of said metallic oxide is 0.5 to 10 parts by weight per 100 parts by weight of the rubber (A). Although a metallic oxide serves also as an adjuvant for vulcanization and processing, its action as an adjuvant is too small and the crosslinkage with the copolymer (B) cannot be formed sufficiently if the amount of the metallic oxide is less than 0.5 parts by weight and, if its amount exceeds 10 parts by weight, blooming or the like occurs, which are both undesirable.

When an amine compound is incorporated, its amount is 1 to 40 parts by weight per 100 parts by weight of the copolymer (B) containing a glycidyl group-containing monomer or chloromethylstyrene, and preferably 1.5 to 20 parts by weight on the same basis. If the amount is less than 1 part by weight, the reaction between the amine commpound and the copolymer (B) cannot progress sufficiently and, consequently the modulus is not increased, and if it exceeds 40 parts by weight, there occurs undesirable blooming or the like.

The rubber composition of this invention is crosslinked through the above-mentioned crosslinking agent (amine compound or metallic oxide) and, in addition, vulcanized with sulfur (including organic sulfur compounds). The rubber composition of this invention is crosslinked by heating it at a temperature of, for example 60° to 200° C., preferably at 100° to 170° C., for a period of 10 minutes to 5 hours. As the means of the heating, either open system or press system may be selected depending upon the shape of object to be heated. The amount of sulfur blended is 0.2 to 7 parts by weight, preferably 0.5 to 5 parts by weight, per 100 parts by weight of the rubber (A). If it exceeds 7 parts by weight, scorch, blooming and the like occur. And if the amount is less than 0.2 part by weight vulcanization is not sufficient. This is undesirable. When the rubber (A) contains glycidyl groups, crosslinking is possible even if sulfur is not used. However, the properties of vulcanized rubber are more excellent when sulfur is used.

Additives which are usually blended with rubber, such as a reinforcing material, a filler, a processing adjuvant, an antioxidant and the like, may be added to the rubber composition of this invention. These additives can be mixed by means of a roll or a Banbury mixer or they may also be added in the course of producing the polymer. However, it is undesirable to add any other additives reactive with the glycidyl group or the chloromethyl group than the above-mentioned crosslinking agent over the whole process of production including the polymerization step.

The rubber composition of this invention is excellent in processability, and the adverse effect of the addition of the copolymer (B) on the vulcanizate properties is only small and the copolymer (B) used as a softening agent is hardly extracted with a solvent or the like.

Therefore, when the rubber composition of this invention is used as a part of composite material, it causes neither an insufficient adhesion to other vulcanized rubbers nor deterioration of the properties of other parts due to the migration of the copolymer (B) into said other parts.

If a diene rubber containing at least 40% by weight of natural rubber or polyisoprene rubber is used as the rubber (A), there can be obtained excellent vibration-proof characteristics, so that it can be used effectively as a vibration insulator for preventing noises and vibrations in transport facilities such as automobile and the like, as well as in industrial machines.

DESCRIPTION OF PREFERRED EMBODIMENTS

This invention will be illustrated below more specifically with reference to Examples and Comparative Examples. The Examples are not by way of limitation but by way of illustration.

(1) PRODUCTION OF COPOLYMER (B)

Example 1

A copolymer (B) was produced by polymerizing 72% by weight of butadiene, 8% by weight of styrene and 20% by weight of glycidyl methacrylate by a conventional free radical emulsion polymerization method at a reaction temperature of 5° C. with tert-dodecylmercaptan as a molecular weight regulator. The conversion was 80%.

Example 2

The same procedure as in Example 1 was repeated, except that styrene was not used and 90% by weight of butadiene and 10% by weight of glycidyl methacrylate were used. The conversion was 80%.

Examples 3 to 9

The same procedure as in Example 1 was repeated except that 72% by weight of butadiene, 18% by weight of styrene and 10% by weight of glycidyl methacrylate were used and the amount of tert-dodecylmercaptan as a molecular weight regulator was varied, to obtain polymers having different $[\eta]$ values as shown in Table 1. The conversion was 80%.

In the case of Example 4, the polymer obtained had the following composition and $[\eta]$:

| | |
|---|---|
| $[\eta]$ as measured in toluene at 30° C. | 0.33 dl/g |
| Glycidyl methacrylate | 8.8% by weight |
| Styrene | 11.3% by weight |
| Butadiene | 79.9% by weight |

The glycidyl methacrylate content and the styrene content were determined by infrared absorption spectrometry.

The butadiene content was calculated by deducting the total contents of the above two components from 100%.

Example 10

The same procedure as in Example 1 was repeated, except that 72% by weight of isoprene, 18% by weight of styrene and 10% by weight of glycidyl methacrylate were used. The conversion was 80%.

(2) COMPOUNDING AND VULCANIZATION

Mixtures were prepared by blending the abovementioned copolymer (B) with a rubber (A) by a wet blend method in the case of Run Nos. 1 and 4 in Table 2 and by a dry blend method in the other cases. The mixtures were then compounded according to the recipe shown in Table 1 and vulcanized under the conditions shown in Table 1.

(3) PHYSICAL PROPERTIES OF VULCANIZATE, MIGRATION PROPERTY AND PROCESSABILITY

Tensile test was carried out according to JIS K 6301.

Though there is no recognized method for measuring the copolymer (B) (softening agent) in the vulcanized rubber composition, the degree of extraction with a solvent as measured by the following method was adopted as a measure.

About 1 g of the vulcanized product was twice extracted with 100-ml portions of toluene at 80° C. each for 5 hours, and the degree of extraction was calculated from the weight loss after the extraction. That is, it can be said that a smaller degree of extraction means a smaller migration property.

The processability was evaluated by measuring compound Mooney viscosity (a lower compound Mooney viscosity as compared with that of the rubber (A) containing neither copolymer (B) nor softening agent means a better processability). Further, the exothermic temperature was measured by means of Brabender Plastograph, and a lower exothermic temperature was regarded as a better processability (a lower exothermic temperature as compared with that of the rubber (A) containing neither copolymer (B) nor softening agent means a better processability).

The results obtained were as shown in Table 2. In Table 2, the comparative examples show the data of the following materials:

Comparative Example 1: the rubber itself obtained by coagulating SBR #1500 latex with methanol (it contains none of the compounding materials shown in Table 1 at all).

Comparative Example 2: a composition obtained by blending 20 parts by weight of a high-aromatic extender oil (JSR AROMA) as a softening agent with 100 parts by weight of the rubber of Comparative Example 1.

Comparative Example 3: a composition having the recipe of Table 1, wherein the copolymer (B) is replaced with 20 parts by weight of a liquid styrene-butadiene rubber obtained by copolymerizing 72 parts by weight of butadiene and 28 parts by weight of styrene by the same process as used for producing the copolymer (B) in Example 1.

Comparative Example 4: a composition having the recipe of Table 1, wherein the copolymer (B) is replaced with a copolymer having a glycidyl group-containing monomer and a small $[\eta]$ value which has been obtained using the same monomers in the same ratios as in Example 3 with a larger amount of tert-dodecylmereaptan under the same polymerization conditions as in Example 3.

As shown in Table 2, Run Nos. 1-10 are lower in compound Mooney viscosity and exothermic temperature and more excellent in processability than Run No. 11. It is also shown that Run Nos. 1, 3, 4 and 6-9 are greatly improved in properties of vulcanizate ($M_{100}$) and migration property (degree of extraction) as compared with Run Nos. 12 and 13. On the other hand, in Run No. 14 in which a copolymer (B) having a glycidyl group-containing monomer, having an $[\eta]$ value of 0.2 dl/g or less, was used, the properties of vulcanizate are low and the degree of extraction is high though the processability is good.

As is apparent from the comparison of Run Nos. 1 and 4 with Run Nos. 2 and 5, in the cases where an amine compound ($C_{II}$) reactive with the glycidyl group was used, there are advantages that modulus ($M_{100}$) in properties of vulcanizate is greater and the degree of extraction of the copolymer (B) is smaller than where said amine compound was not used.

TABLE 1
Recipe and Vulcanization Conditions

| | |
|---|---|
| Rubber (A) (styrene-butadiene rubber*) | 100 parts |
| Copolymer (B) | 20 parts |
| ISAF Carbon Black | 50 parts |
| Zinc oxide ($C_I$) | 5 parts |
| Stearic acid | 3 parts |
| Vulcanization accelerator NOBS | 1.5 parts |
| Sulfur | 2.5 parts |
| Amine compound ($C_{II}$) | Varied |
| Vulcanization temperature | 145° C. |
| Vulcanization time | 60 min |

Note:
*SBR #1500 manufactured by Japan Synthetic Rubber Co. (combined styrene 23.5%, Mooney viscosity $ML_{1+4}^{100°\,C.}$ 52).

(4) PRODUCTION OF COPOLYMER (B)

Examples 11–14 and Comparative Example 7

72 parts by weight of butadiene, 18 parts by weight of styrene and 10 parts by weight of chloromethylstyrene were compolymerized by a conventional free radical emulsion polymerization process at 5° C. with a varying quantity of tert-dodecylmercaptan as a molecular weight regulator. The conversion was 80%, and the $[\eta]$ values of the copolymers obtained were as shown in Table 4. The result of, for example, Example 11 was as follows:

| | |
|---|---|
| $[\eta]$ as measured in toluene at 30° C. | 0.78 dl/g |
| Chloromethylstyrene content (% by weight) | 9.5 |
| Styrene content (% by weight) | 16.8 |
| Butadiene content (% by weight) | 73.7 |

The chloromethylstyrene content was determined from the elementary analysis of halogen.

The styrene content was determined by infrared absorption spectrometry.

The butadiene content was calculated by deducting the total contents of the above two components from 100%.

Example 15

The reaction was carried out in the same manner as in Example 11, except that 72 parts by weight of butadiene, 23 parts by weight of styrene and 5 parts by weight

TABLE 2

| Run No. | Copolymer (B) Kind | Copolymer (B) $[\eta]^1$ | Kind of rubber (B) | Amine compound ($C_{II}$) Kind | Amount$^3$ (parts by wt.) | Compound$^2$ Mooney viscosity $ML_{1+4}^{100°\,C.}$ | Properties of vulcanized product $M_{100}$ (kg/cm$^2$) | Properties of vulcanized product $T_B$ (kg/cm$^2$) | Properties of vulcanized product $E_B$ (%) | Migration property$^5$ (Degree of extraction) (%) | Exothermic temperature (°C.) | Remarks |
|---|---|---|---|---|---|---|---|---|---|---|---|---|
| 1 | Example 1 | 0.69 | SBR | Piperazine glycolate | 14 | 58.5 | 53 | 181 | 296 | 8 | 119 | Present invention |
| 2 | Example 1 | 0.69 | " | — | 0 | 58.5 | 24 | 193 | 467 | 24 | 119 | Comparison |
| 3 | Example 2 | 0.52 | " | Piperazine glycolate | 14 | 53.5 | 49 | 177 | 280 | 6 | 117 | Present invention |
| 4 | Example 3 | 0.50 | " | Piperazine glycolate | 14 | 51.5 | 40 | 199 | 339 | 7 | 115 | Present invention |
| 5 | Example 3 | 0.50 | " | — | 0 | 51.5 | 24 | 240 | 512 | 22 | 115 | Comparison |
| 6 | Example 4 | 0.33 | " | Piperazine glycolate | 14 | 48.5 | 47 | 174 | 313 | 11 | 115 | Present invention |
| 7 | Example 5 | 0.70 | " | Hexamethylene-diamine sebacate | 14 | 55.0 | 34 | 196 | 344 | 9 | 118 | Present invention |
| 8 | Example 6 | 0.70 | " | Hexamethylene-diamine succinate | 10 | 55.0 | 34 | 176 | 358 | 12 | 118 | Present invention |
| 9 | Example 7 | 0.70 | " | Hexamethylene-diamine succinate | 8 | 55.0 | 36 | 167 | 329 | 14 | 118 | Present invention |
| 10 | Example 10 | 0.70 | " | Piperazine glycolate | 14 | 53.0 | 35 | 185 | 320 | 6 | 116 | Present invention |
| 11 | Comparative Example 1 | — | " | — | 0 | 88.0 | 50 | 247 | 299 | — | 132 | Comparison |
| 12 | Comparative Example 2 | —$^4$ | " | — | 0 | 49.5 | 26 | 174 | 403 | 93 | 118 | " |
| 13 | Comparative Example 3 | 0.44 | " | — | 0 | 48.5 | 23 | 206 | 474 | 44 | 118 | " |
| 14 | Comparative Example 4 | 0.14 | " | Piperazine glycolate | 14 | 48.5 | 31 | 219 | 419 | 42 | 113 | " |

Note:
$^1$Measured in toluene at 30° C.
$^2$Values given by compositions not containing accelerator, sulfur nor amine compound ($C_{II}$).
$^3$Based on 100 parts by weight of the copolymer (B).
$^4$In place of the copolymer (B), 20 parts by weight of high-aromatic extender oil was added to 100 parts by weight of the rubber (A).
$^5$Degree of extraction of the copolymer (B) or extender oil. $M_{100}$: modulus of elasticity. $T_B$: tensile strength at break $E_B$: elongation at break of chloromethylstyrene were used. The conversion was 80%.

Example 16

The reaction was carried out in the same manner as in Example 11, except that 72 parts by weight of butadiene, 13 parts by weight of styrene and 15 parts by weight of chloromethylstyrene were used. The conversion was 80%.

Example 17

The reaction was carried out in the same manner as in Example 11, except that 72 parts by weight of butadiene, 8 parts by weight of styrene and 20 parts by weight of chloromethylstyrene were used. The conversion was 80%.

Example 18

The reaction was carried out in the same manner as in Example 11, except that 90 parts by weight of butadiene and 10 parts by weight of chloromethylstyrene were used. The conversion was 80%.

Example 19

The reaction was carried out in the same manner as in example 11, except that 72 parts by weight of isoprene, 18 parts by weight of styrene and 10 parts by weight of chloromethylstyrene were used. The conversion was 80%.

(5) COMPOUNDING AND VULCANIZATION

Mixtures were prepared by blending the abovementioned copolymer (B) with a rubber (A) by a wet blend method in the case of Run No. 15 in Table 3 and by a dry blend method in the other cases. Then they were compounded according to the recipe shown in Table 1 and the compounds obtained were vulcanized under the conditions shown in Table 1, provided that a press-vulcanization was carried out at 160° C. for 60 minutes in case of Run Nos. 15, and 17–24 in Table 3.

(6) PHYSICAL PROPERTIES OF VULCANIZATE, MIGRATION PROPERTY AND PROCESSABILITY

By the same procedures as in above item (3), the properties of vulcanizates, the migration property of the copolymer (B) and the processabilities of the compositions were measured to obtain the results shown in Table 3.

TABLE 3

| Run No. | Copolymer (B) Kind | Copolymer (B) $[\eta]^1$ | Kind of rubber (A) | Amine compound $(C_{II})$ Kind | Amine compound $(C_{II})$ Amount³ (parts by wt.) | Compound² Mooney viscosity $ML_{1+4}^{100° C.}$ | Properties of vulcanizate $M_{100}$ (kg/cm²) | Properties of vulcanizate $T_B$ (kg/cm²) | Properties of vulcanizate $E_B$ (%) | Migration property⁵ (Degree of extraction) (%) | Exothermic temperature (°C.) | Remarks |
|---|---|---|---|---|---|---|---|---|---|---|---|---|
| 15 | Example 11 | 0.78 | SBR | — | 0 | 58.5 | 51 | 176 | 229 | 5 | 119 | Present invention |
| 16 | Example 12 | 0.78 | " | Piperazine glycolate | 14 | 62.5 | 55 | 197 | 242 | 3 | 119 | |
| 17 | Example 13 | 0.53 | " | — | 0 | 48.5 | 50 | 219 | 265 | 8 | 114 | |
| 18 | Example 15 | 0.67 | " | — | 0 | 53.5 | 48 | 221 | 234 | 15 | 116 | |
| 19 | Example 16 | 0.59 | " | — | 0 | 50.5 | 52 | 197 | 224 | 7 | 115 | |
| 20 | Example 17 | 0.48 | " | — | 0 | 48.0 | 54 | 184 | 234 | 4 | 113 | |
| 21 | Example 18 | 0.50 | " | — | 0 | 50.5 | 47 | 180 | 249 | 8 | 115 | |
| 22 | Example 19 | 0.41 | " | — | 0 | 47.0 | 46 | 182 | 250 | 5 | 113 | |
| 23 | Example 14 | 0.78 | " | Piperazine maleate | 12 | 61.5 | 49 | 175 | 242 | 4 | 119 | |
| 24 | Comparative Example 7 | 0.16 | " | — | — | 45.0 | 40 | 198 | 252 | 26 | 36 | Comparison |
| 11 | Comparative Example 1 | — | " | — | — | 88.0 | 50 | 247 | 299 | — | 132 | |
| 12 | Comparative Example 2 | —⁴ | " | — | — | 49.5 | 26 | 174 | 403 | 93 | 118 | |
| 13 | Comparative Example 3 | 0.44 | " | — | — | 48.5 | 23 | 206 | 474 | 44 | 118 | |

Note:
¹Measured in toluene at 30° C.
²Values given by compositions free from accelerator, sulfur and amine compound $(C_{II})$.
³Based on 100 parts by weight of the copolymer (B).
⁴In place of the copolymer (B), 20 parts by weight of high-aromatic extender oil was added to 100 parts by weight of the rubber (A).
⁵Degree of extraction of the copolymer (B) or extender oil.
$M_{100}$, $T_B$ and $E_B$: the same as in Table 2.

It is apparent that Run Nos. 15–23 are lower in Mooney viscosity of formulated rubber and exothermic temperature and more excellent in processability than Run No. 11. It is also apparent that Run Nos. 15–23 are greatly improved in physical properties of vulcanizates ($M_{100}$) and migration property (degree of extraction) as compared with Run Nos. 12 and 13. On the other hand, in Run No. 24 in which a chloromethylstyrene-containing copolymer (B) having an [η] value of 0.2 dl/g or less (the copolymer of Comparative Example 7) was used, the properties of vulcanized product ($M_{100}$) are low and the rate of extraction is high through the processability is good. It is apparent from the Run Nos. 15 and 17–22 that when chloromethylstyrene-containing copolymer (B) is used, metallic oxide ($C_I$) alone is enough to exhibit an effect as a crosslinking agent for the copolymer (B).

Example 20

By using the copolymers (B) obtained in Examples 8 and 9, compositions were prepared by the same procedure as in above items (2) and (3) according to the recipe of Table 4, and the compositions were vulcanized under the conditions shown in Table 4. The properties of vulcanizate, the migration property and the processability were measured to obtain the results shown in Table 5. In Table 5, the case in which the copolymer (B) was replaced by a high-aromatic extender oil is also shown for comparison. The compositions prepared from the copolymers (B) of Examples 8 and 9 exhibit good properties of vulcanizate and good processability and, furthermore, are much lower in degree of extraction than the compositions containing the extender oil (Run Nos. 26 and 28).

TABLE 4

| Recipe and vulcanization conditions | | | | |
|---|---|---|---|---|
| | Run No. (parts by weight) | | | |
| | 25 | 26 | 27 | 28 |
| Polybutadiene rubber[1] (rubber (A)) | 100 | 100 | — | — |
| Polyisoprene rubber[2] (rubber (A)) | — | — | 100 | 100 |
| Copolymer (B) of Example 8 | 20 | — | — | — |
| Copolymer (B) of Example 9 | — | — | 20 | — |
| High-aromatic extender oil | — | 20 | — | 20 |
| ISAF Carbon Black | 50 | 50 | 50 | 50 |
| Zinc oxide ($C_I$) | 5 | 5 | 5 | 5 |
| Stearic acid | 3 | 3 | 3 | 3 |
| Vulcanization accelerator | | | | |
| NOBS | 1.5 | 1.5 | 0.5 | 0.5 |
| Sulfur | 2.5 | 2.5 | 2.5 | 2.5 |
| Amine compound ($C_{II}$) (piperazine stearate) | 14[3] | 0 | 14[3] | 0 |
| Vulcanization temperature (°C.) | 145 | 145 | 145 | 145 |
| Vulcanization time (min) | 30 | 30 | 30 | 30 |

Note:
[1]BR01, a trade name of Japan Synthetic Rubber Co., Ltd. (cis content: 97%, Mooney viscosity $ML_{1+4}^{100°C}$: 44).
[2]IR 2200, a trade name of Japan Synthetic Rubber Co., Ltd. (cis content: 98%, Mooney viscosity $ML_{1+4}^{100°C}$: 82).
[3]Based on 100 parts by weight of the copolymer (B).

TABLE 5

| Run No. | Copolymer (B) Kind | [η][1] | Rubber (A) | Compound[2] Mooney viscosity $ML_{1+4}^{100°C}$ | Physical properties[3] of vulcanizate | | | Migration property (Degree of extraction) (%) |
|---|---|---|---|---|---|---|---|---|
| | | | | | $M_{100}$ (kg/cm²) | $T_B$ (kg/cm²) | $E_B$ (%) | |
| 25 | Example 8 | 0.70 | BR | 59.5 | 44 | 131 | 277 | 33 |
| 26 | — | —[3] | BR | 55.5 | 21 | 136 | 448 | 97 |
| 27 | Example 9 | 0.70 | IR | 44.5 | 34 | 152 | 347 | 37 |
| 28 | — | —[3] | IR | 46.5 | 15 | 142 | 484 | 98 |

Note:
[1]Measured in toluene at 30° C.
[2]Values given by compositions free from accelerator, sulfur and amine compound ($C_{II}$).
[3]20 parts by weight of high-aromatic extender oil was added to 100 parts by weight of the rubber (A).
$M_{100}$, $T_B$ and $E_B$: the same as in Table 2.

$10^{-4}$ was employed as the repeated fatigue characteristic. Accordingly, the greater the value the better.

TABLE 6

| | Example | | Comparative Example | |
|---|---|---|---|---|
| | 21 | 22 | 8 | 9 |
| Natural rubber (part by wt.) | 50 | 50 | 50 | 50 |
| cis-1,4-Polybutadiene (part by wt.) | 50 | 50 | 50 | 50 |
| Plasticizer*[1] (part by wt.) | | | | |
| A | 20 | | | |
| B | | 20 | | |
| C | | | 20 | |
| D | | | | 20 |
| ISAF Carbon Black (part by wt.) | 60 | 60 | 60 | 60 |
| Piperazine glycolate (part by wt.) | 1.7 | — | — | — |
| NOBS*[2] (part by wt.) | 0.6 | 0.6 | 0.6 | 0.6 |
| MBTS*[3] (part by wt.) | 0.15 | 0.15 | 0.15 | 0.15 |
| Zinc oxide (part by wt.) | 4.0 | 4.0 | 4.0 | 4.0 |
| Stearic acid (part by wt.) | 2.0 | 2.0 | 2.0 | 2.0 |
| Sulfur (part by wt.) | 2.0 | 2.0 | 2.0 | 2.0 |
| Vulcanization conditions | at 150° C. for 30 min. | | | |

Note:
*[1]A: Liquid glycidyl group-containing styrene-butadiene copolymer (styrene 23.3% by wt., glycidyl methacrylate 9.6% by wt., $[\eta]_{30°C}^{toluene} = 0.56$ dl/g)
B: Liquid chloromethylstyrene-containing styrene-butadiene copolymer (chloromethylstyrene 5.8% by weight, total styrene 27.0% by weight, $[\eta]_{30°C}^{toluene} = 0.80$ dl/g)
C: Liquid polybutadiene ($[\eta]_{30°C}^{toluene} = 0.7$ dl/g)
D: High-aromatic extender oil, JSR-AROMA, a trade name of Japan Synthetic Rubber Co., Ltd.
*[2]NOBS: A mixture of N-oxydiethylene-2-benzothiazylsulfenamide and dibenzothiazyl disulfide.
*[3]MBTS: Dibenzothiazyl disulfide

Examples 21 and 22 and Comparative Examples 8 and 9

Compounding and vulcanization were carried out by employing the recipe and vulcanization conditions shown in Table 6.

The results are shown in Table 7. It is apparent that the rubber compositions comprising mainly natural rubber or polyisoprene rubber as the rubber (A) are particularly excellent in vibration-proof characteristics.

As a measure of processability, compound Mooney viscosity $ML_{1+4}^{100°C}$ was employed. Hardness and compression set were measured according to JIS K 6301, wherein the conditions of compression set were at 70° C. for 22 hours. Static-dynamic ratio and static spring constant and were expressed by the value of Young's modulus measured with Viscoelastic Spectrometer manufactured by Iwamoto Seisakusho. The repeated extension fatigue characteristic was determined as follows: Repeated extensions were applied to each sample at an extension degree giving a tensile stress of 100 kgf/cm², measuring the number of repeated extensions N at break, and the product of N and

TABLE 7

| | Example | | Comparative Example | |
|---|---|---|---|---|
| | 21 | 22 | 8 | 9 |
| Compound Mooney viscosity $ML_{1+4}^{100°C}$ | 58 | 60 | 62 | 51 |
| Hardness (JIS-A) | 71 | 68 | 60 | 61 |
| Static spring constant E' × $10^{-8}$ (dyne/cm²) | 1.32 | 1.39 | 0.91 | 0.99 |
| Static-dynamic ratio $E'_{100HZ}/E'_{5HZ}$ | 1.27 | 1.30 | 1.30 | 1.30 |
| Compression set (%) | 26 | 23 | 31 | 29 |
| Repeated extension fatigue characteristic (N × $10^{-4}$) | 7.2 | 4.0 | 1.2 | 1.8 |

What is claimed is:

1. A rubber composition comprising (A) 100 parts by weight of a rubber, (B) 5-50 parts by weight of a low molecular weight diene copolymer containing a glycidyl group-containing monomer or chloromethylstyrene and having an intrinsic viscosity of 0.2 to 1.3 dl/g as measured in toluene at 30° C., (C) a specified crosslinking agent reactive with the glycidyl or chloromethyl group of the copolymer (B), and (D) 0.2 to 7 parts by weight, per 100 parts by weight of the rubber (A), of sulfur.

2. A rubber composition according to claim 1, wherein the component (B) is the low molecular weight diene copolymer containing a glycidyl group-containing monomer, the specified crosslinking agent reactive with the glycidyl group of the copolymer (B) is an amine compound ($C_{II}$) and the amount of the amine compound ($C_{II}$) is 1-40 parts by weight per 100 parts by weight of the copolymer (B).

3. A rubber composition according to claim 1, wherein the component (B) is the low molecular weight diene copolymer containing chloromethylstyrene, the specified crosslinking agent reactive with the chloromethyl group of the copolymer (B) is a metallic oxide ($C_I$) and the amount of the metallic oxide ($C_I$) is 0.5-10 parts by weight per 100 parts by weight of the rubber (A).

4. A rubber composition according to claim 1, wherein the component (B) is the low molecular weight diene copolymer containing chloromethylstyrene, the specified crosslinking agent reactive with the chloromethyl group of the copolymer (B) is an amine compound ($C_{II}$) and the amount of the amine compound ($C_{II}$) is 1-40 parts by weight per 100 parts by weight of the copolymer (B).

5. A rubber composition according to claim 1, wherein the component (B) is the low molecular weight diene copolymer containing chloromethylstyrene, the specified crosslinking agent reactive with the chloromethyl group of the copolymer (B) is a combination of an amine compound ($C_{II}$) and a metallic oxide ($C_I$), the amount of the amine ($C_{II}$) is 1-40 parts by weight per 100 parts by weight of the copolymer (B), and the amount of the metallic oxide ($C_I$) is 0.5-10 parts by weight per 100 parts by weight of the rubber (A).

6. A rubber composition according to claim 1, 2, 3, 4 or 5, wherein the proportion of gylcidyl group-containing monomer or chloromethylstyrene in the copolymer (B) is 5-30% by weight.

7. A rubber composition according to claim 1, 2, 3, 4, 5 or 6, wherein the copolymer (B) is a copolymer of a glycidyl group-containing monomer or chloromethylstyrene and a conjugated diene having 4 or 5 carbon atoms.

8. A rubber composition according to claim 1, 2, 3, 4, 5 or 6 wherein the copolymer (B) is a copolymer of a glycidyl group-containing monomer or chloromethylstyrene, a conjugated diene having 4 or 5 carbon atoms and 30% by weight or less of styrene.

9. A rubber composition according to claim 3 or 5, wherein the metallic oxide ($C_I$) is zinc oxide.

10. A rubber composition according to claim 2, 4 or 5, wherein the amine compound ($C_{II}$) is a polyamine or a polyamine salt of a carboxylic acid.

11. A rubber composition according to claim 2, 4 or 5, wherein the amine compound ($C_{II}$) is a polyamine salt of a carboxylic acid.

* * * * *